Oct. 31, 1967  C. VAN DER LELY  3,349,549
HARVESTERS
Filed Jan. 19, 1965  12 Sheets-Sheet 1

INVENTOR.
CORNELIS VAN DER LELY
BY
Mason, Mason & Albright
Attorneys

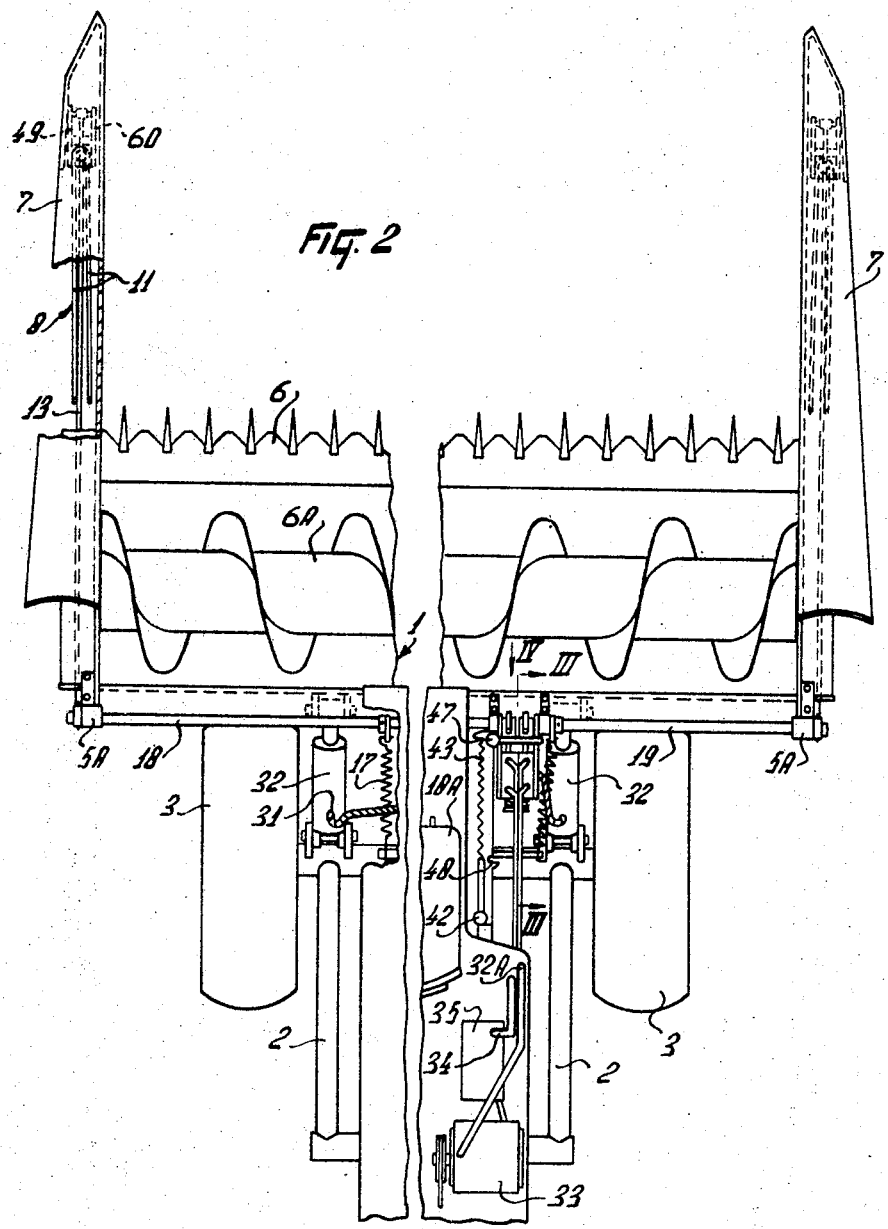

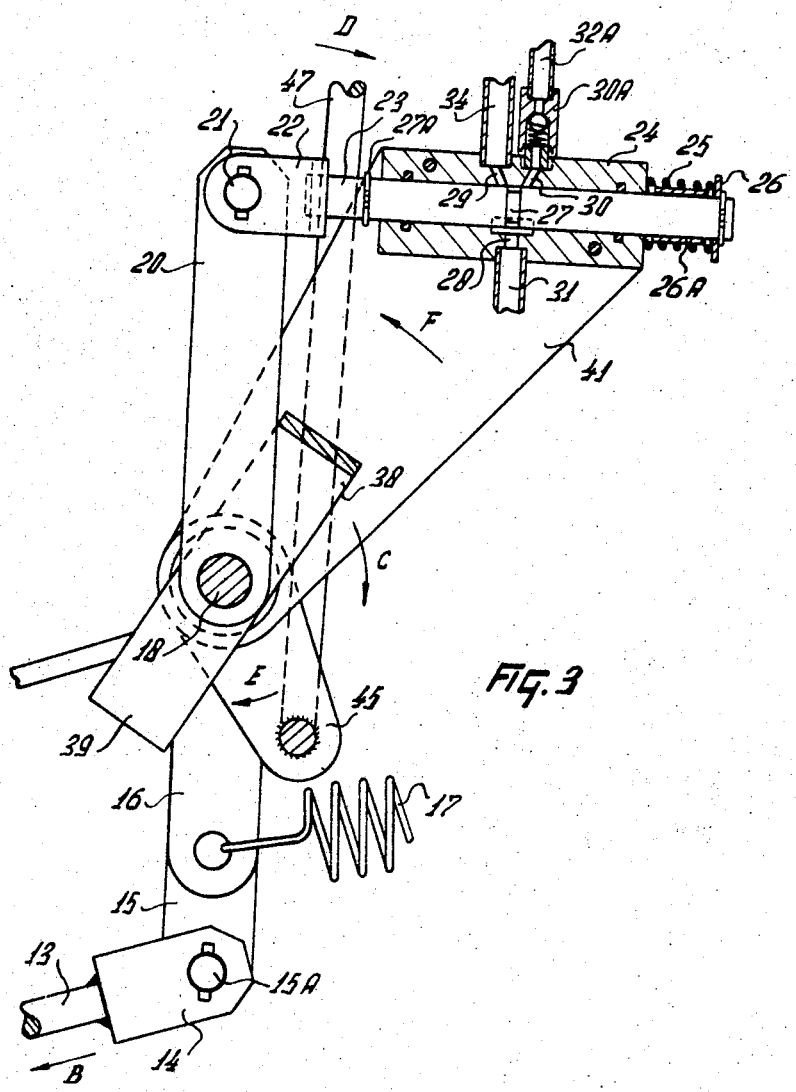

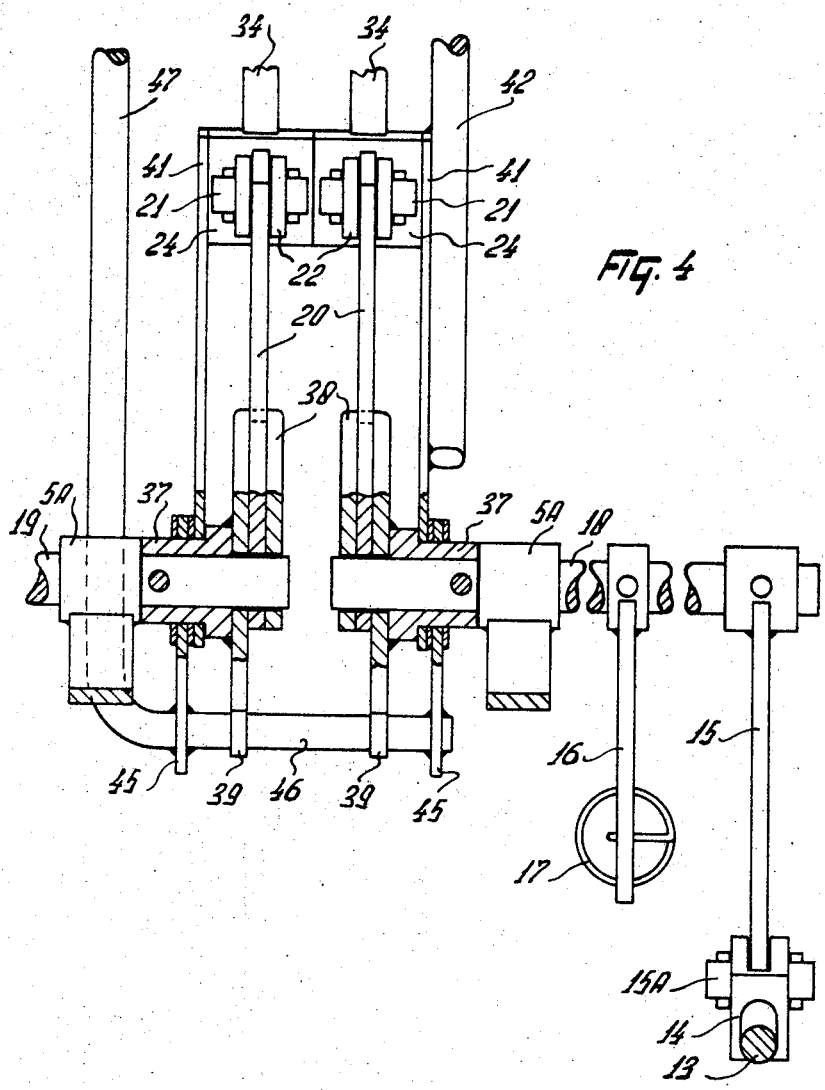

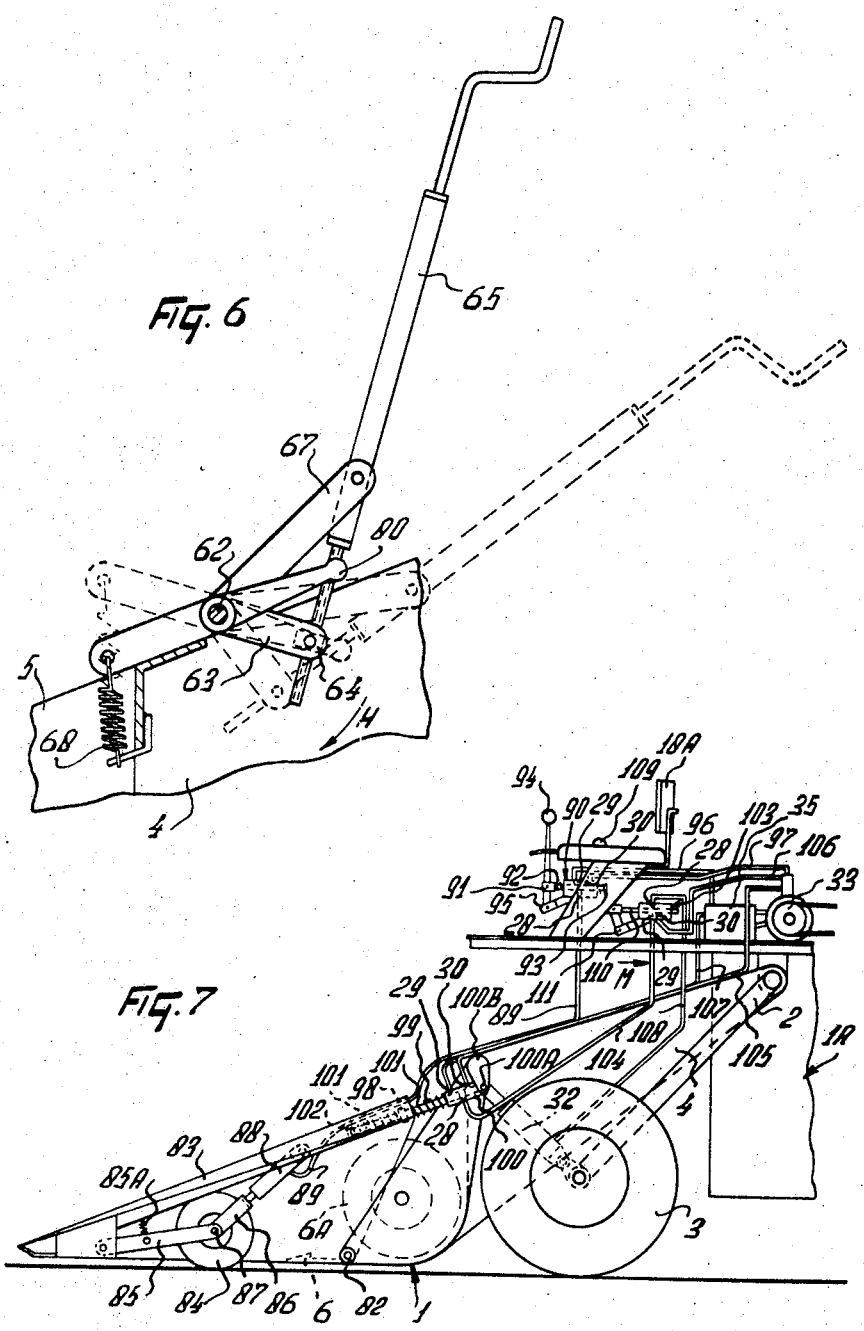

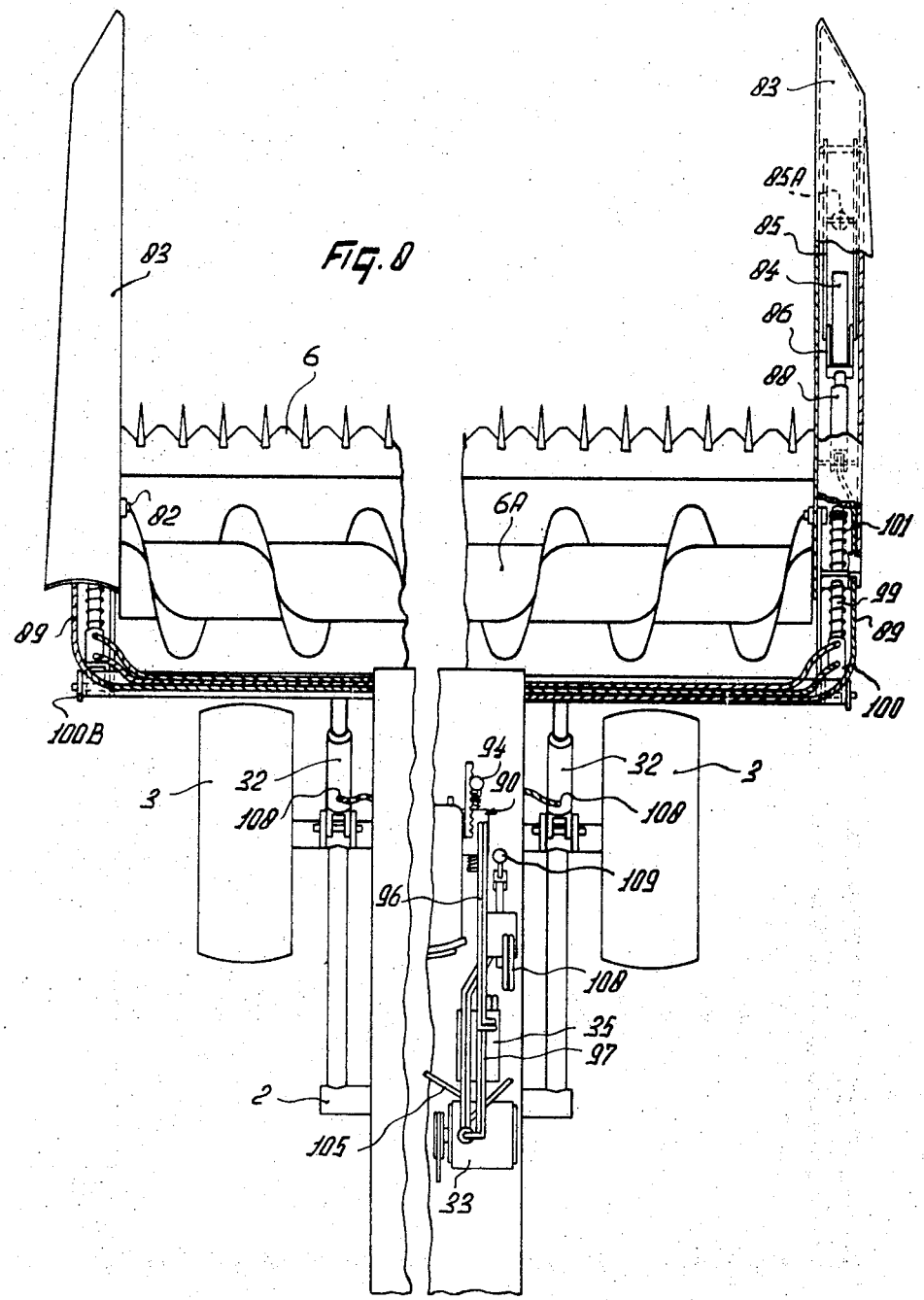

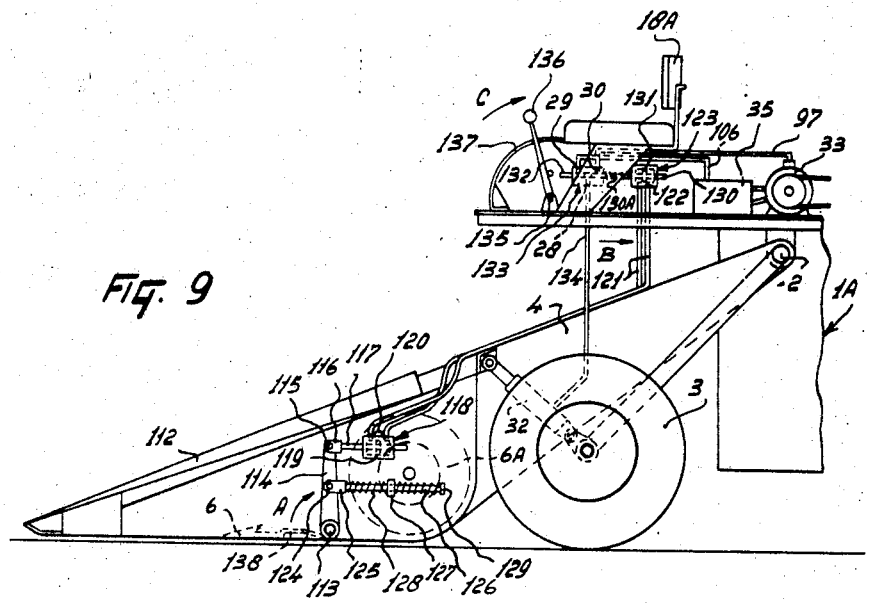

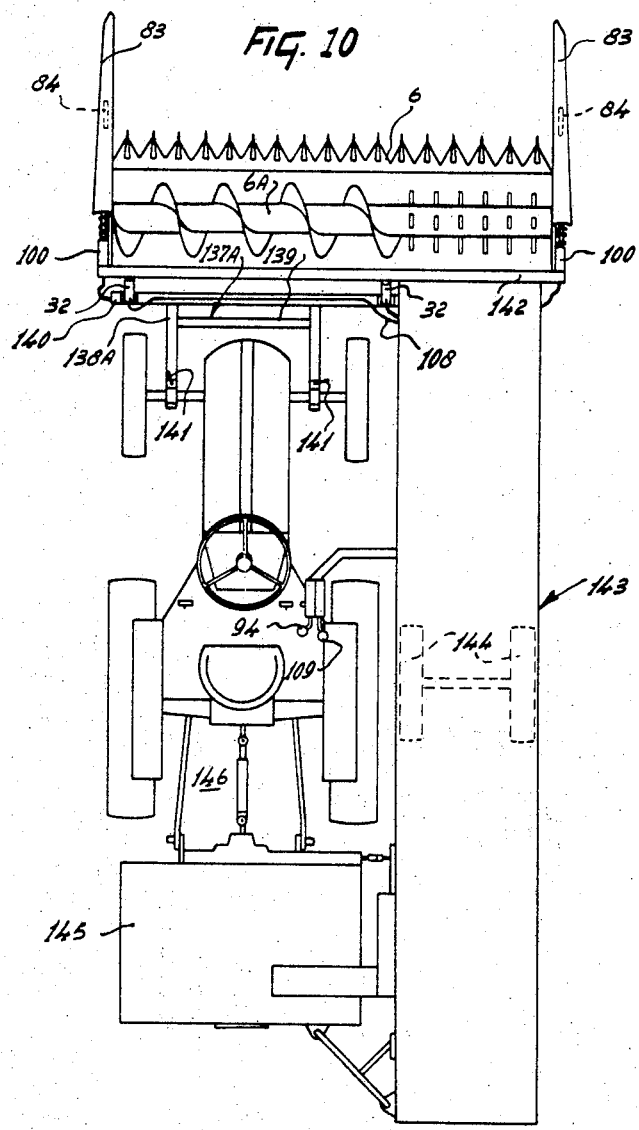

Oct. 31, 1967    C. VAN DER LELY    3,349,549
HARVESTERS
Filed Jan. 19, 1965    12 Sheets-Sheet 9
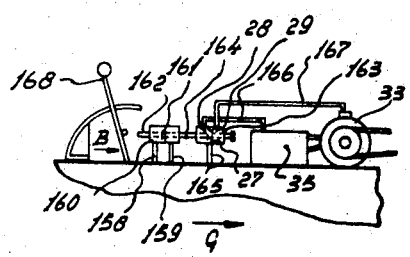
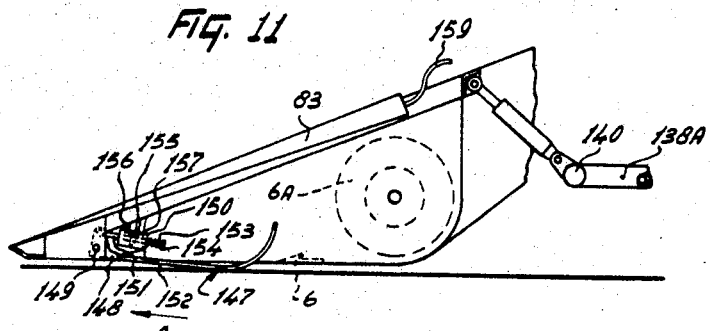
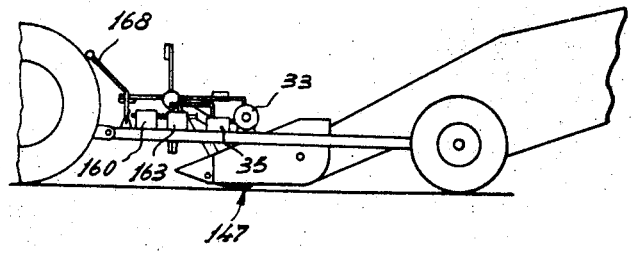
INVENTOR.
CORNELIS VAN DER LELY
BY
Mason, Mason & Albright
Attorneys

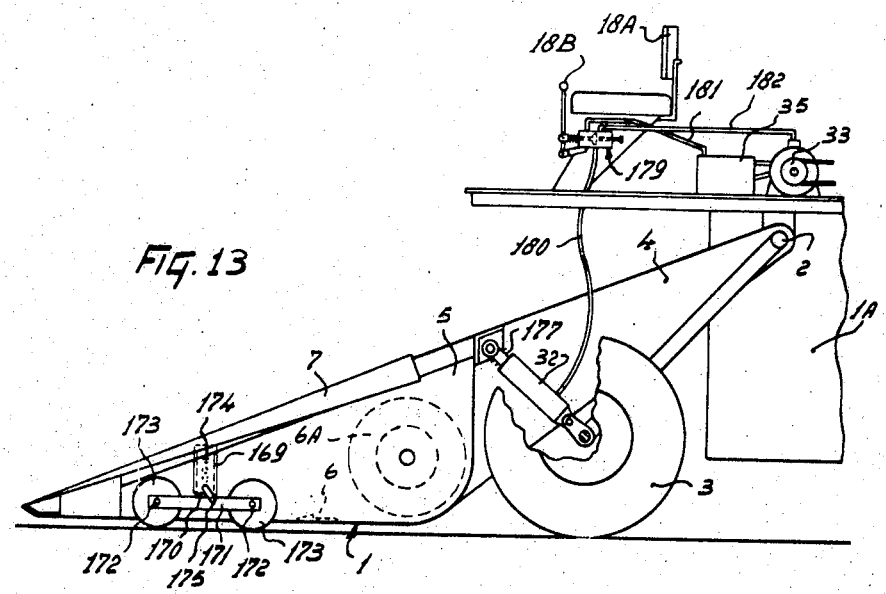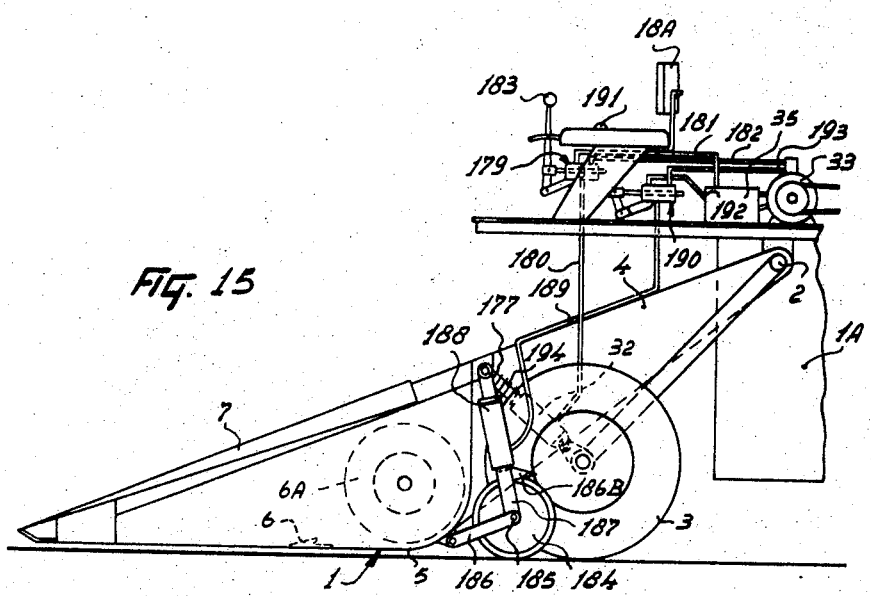

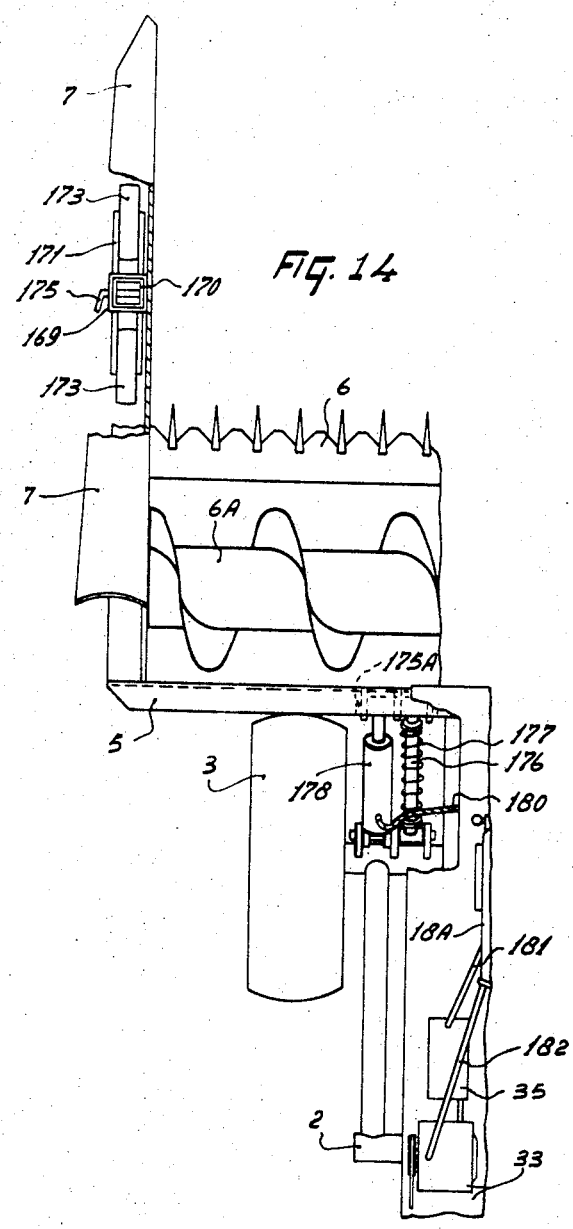

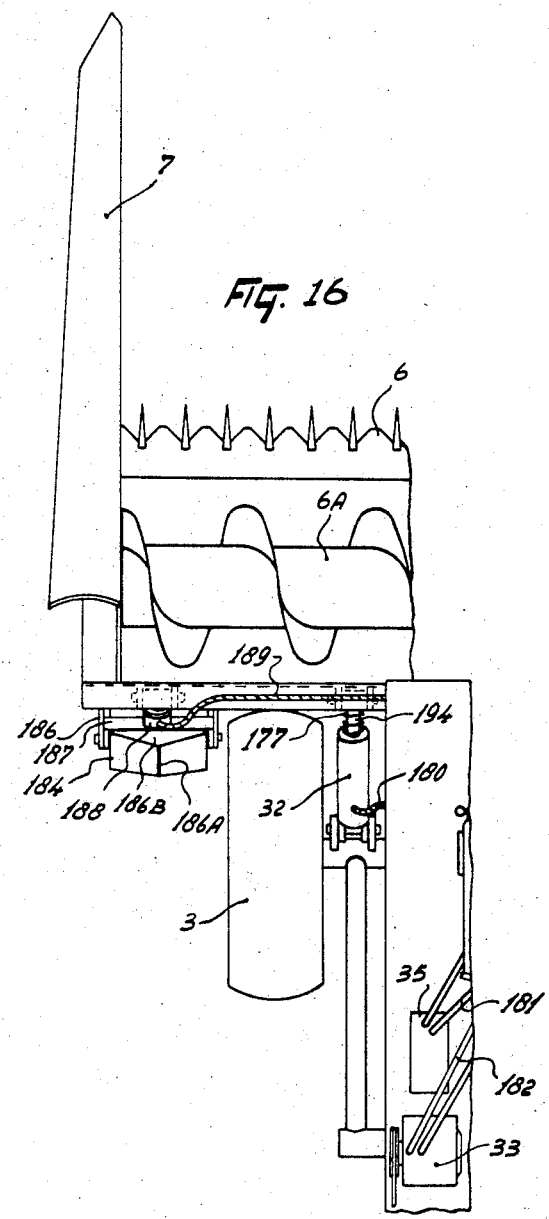

United States Patent Office 3,349,549
Patented Oct. 31, 1967

3,349,549
HARVESTERS
Cornelis Van Der Lely, Zug, Switzerland, assignor to Texas Industries Inc., Willemstad, Curacao, Netherlands Antilles, a limited liability company of the Netherlands
Filed Jan. 19, 1965, Ser. No. 426,636
Claims priority, application Netherlands, Feb. 12, 1964, 64—1,163, 64—1,164, 64—1,165, 64—1,166
8 Claims. (Cl. 56—21)

ABSTRACT OF THE DISCLOSURE

A harvester thresher with a pivoted vertically adjustable table including crop dividers at either side of the table. The table and crop dividers are responsive to ground irregularities through the interaction of one or more feeler members with the contour of the ground. The feeler members are pivotally connected to the table under the crop dividers forward of a mower disposed on the table.

The invention relates to a harvester comprising a cutting or pick-up device, on either side of which there are arranged crop dividers.

According to the invention at least one feeler member is arranged beneath each of the crop dividers, said member being adapted to co-operate with an adjusting mechanism for adapting the position of the cutting or pick-up device to the ground surface, said member being located viewed in the direction of travel, in front of the cutting or pick-up device. With this construction an effective operation of the feeler member is ensured.

For a better understanding of the invention and to show how the same may be readily carried into effect, reference is made by way of example to the accompanying drawing.

FIGURE 2 is partly a plan view of the portion shown in FIGURE 1.

FIGURE 3 shows on an enlarged scale a sectional view taken on the line III—III in FIGURE 2.

FIGURE 4 shows on an enlarged scale an elevation in the direction of the arrow IV in FIGURE 2.

FIGURE 6 shows on an enlarged scale the adjusting device for the feeler member in FIGURE 5.

FIGURE 7 is a side elevation of the foremost portion of a third embodiment, shown diagrammatically, of a harvester-thresher according to the invention; also in this case the reel is omitted.

FIGURE 8 shows on an enlarged scale a fragmentary plan view of the portion shown in FIGURE 7.

FIGURE 9 is a side elevation of a front portion (shown diagrammatically) of a fourth embodiment of a harvester-thresher according to the invention, the reel being omitted.

FIGURE 10 shows diagrammatically a harvester-thresher attached to a tractor, said thresher being provided with feeler members and an adjusting mechanism of the kind shown in FIGURE 7 actuated by said feeler members.

FIGURE 11 shows on an enlarged scale the cutting device of the harvester-thresher of FIGURE 10, located in front of the tractor, said thresher being shown in a further embodiment of the invention.

FIGURE 12 shows diagrammatically a drawn harvester-thresher comprising the construction according to the invention (shown diagrammatically).

FIGURE 13 is a side elevation of the front portion (shown diagrammatically) of a harvester-thresher, feeler wheels being arranged on the mowing platform.

FIGURE 14 shows on an enlarged scale a partial plan view of the part shown in FIGURE 13.

FIGURE 15 is a side elevation of a front portion (shown diagrammatically) of a second embodiment of a harvester-thresher having feeler wheels arranged on the mowing platform.

FIGURE 16 is a partial plan view of the part shown in FIGURE 15.

Figure 1:
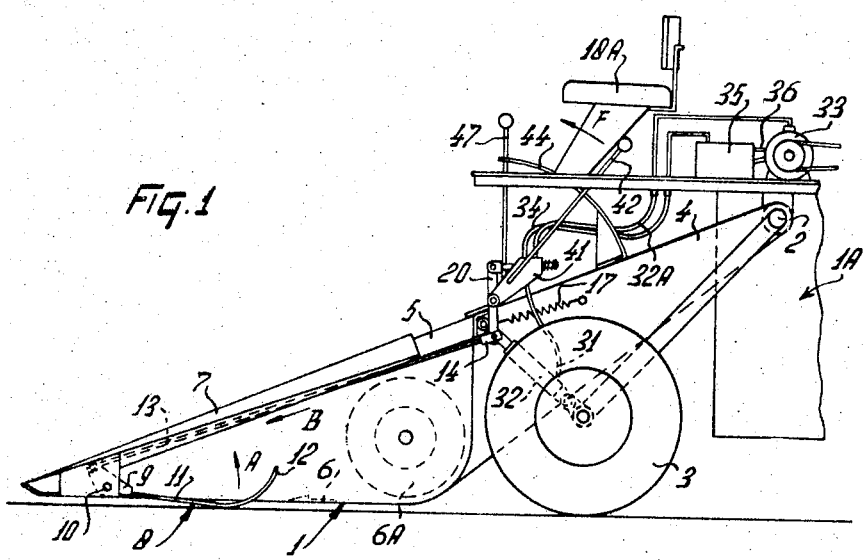
FIGURE 1 is a side elevation of the front part of a harvester-thresher according to the invention, shown diagrammatically, the reel being omitted for the sake of clarity.

The device shown in FIGURES 1 and 2 forms a combine, the front portion of which is shown diagrammatically in the figures. This front portion comprises a platform 1, which is adapted to pivot in a vertical direction about a horizontal shaft 2, extending transversely of the direction of travel. Ground wheels 3 are disposed on the front side of frame 1A. The platform 1 comprises an elevator part 4 and a portion 5 in which the cutting mechanism formed by a cutter bar 6 and an auger 6A, located behind the cutter bar for the lateral delivery of the mown crop, are supported.

From FIGURE 2 it will be seen that on either side of the cutter bar 6 the part 5 of the platform 1 is provided with a support extending in the direction of travel and formed by a crop divider 7. This crop divider is formed by the bent-over upper rim of the wall of the platform 1, which wall is, viewed from the side, triangular and extends upwardly from the cutter bar to the front. Near the front side a feeler 8 is fastened, below the bent-over rim, to each crop divider 7. The feeler 8 is pivoted by means of an arm 9 to a substantially horizontal shaft 10, extending transversely of the direction of travel, and located in a front of the feeler 8, viewed in the direction of travel.

The feeler 8 is formed by two bars 11, lying side by side and extending to the rear from their fastening point and made from a single piece of spring steel, bent in hairpin fashion, the curved portions being secured to the arm 9 (see FIGURE 2). Near the free end of the feeler 8 the bars are bent over upwardly over a portion 12. The arm 9 which supports the feeler 8, is hinged to a rod 13, extending beneath the upper side of the crop divider 7 in the longitudinal direction of the latter, said rod being provided at the other end with a fork 14, accommodating between its limbs a vertical arm 15, which is adapted to pivot around a shaft 15A (see FIGURE 3). The arm 15 is secured to a horizontal shaft 18 extending transversely of the direction of travel, and rotatably journalled in bearings 5A, secured to the part 5. The shaft 18 is provided with a downwardly extending arm 16, which is coupled by means of a draw spring 17 with the wall of the elevator part 4 of the platform 1 (see FIGURE 3). The shaft 18, viewed in plan, extends to the proximity of the driver's seat 18A. In line with the shaft 18 a shaft 19 is journalled in bearings 5A, said shaft being shorter than the shaft 18. The shaft 19 is also provided with an arm 16 and a draw spring 17, secured thereto and is coupled with a feeler in the manner described for the shaft 18 (see FIGURE 3). The facing ends of the shafts 18 and 19, with which the feelers 8 are coupled, are located near each other (see FIGURE 4), and are provided each with a vertical lever 20, which is freely rotatable on the shafts 18 and 19.

By means of a pin 21 the lever 20 is pivoted between the limbs of a bracket 22, which is secured to a sliding rod 23, which is slidably arranged in a housing 24. The rod 23 extends, at the end remote from the bracket, beyond the housing 24 and is surrounding at said end by a spring 25, which is arranged between a stop 26 on the rod and the housing 24. Between the housing 24 and the stop 26 the rod 23 is surrounded by a sleeve 26A, which limits a displacement of the rod 23 with respect to the housing 24. On the side of the bracket 22 the rod is provided, beyond the housing 24, with a stop 27A. The rod 23 and the housing 24 constitute a valve for each feeler separately. The sliding rod 23 is provided with a bore 27, which is adapted to co-operate with a bore 28 and two opposite bores 29 and 30 in the housing 24. The bores 29 and 30 are spaced apart from each other by a distance which is slightly greater than the diameter of the bore 27 in the sliding rod. The bore 28 is located just between the bores 29 and 30. The opening of the bore 28 located on the side of the sliding rod 23 has a width which is equal to the width of the openings of the bores 29 and 30 facing to the sliding rod 23 and the distance between said two bores. The bore 28 communicates through a duct 31 with a lifting cylinder 32. Such a lifting cylinder is provided for each valve on either side of the elevator part 4 between the frame of the combine and the platform. The bore 30 communicates through a check valve 30A and a duct 32A with a supplemental pump 33 while the bore 29 communicates via a duct 34 with a supplemental tank 35. Between the tank 35 and the pump 33 ducts 36 are provided.

By means of sleeves 37, which are secured to the shafts 18 and 19 on the remote sides of the levers 20, said shafts are surrounded by a bracket 38, the web of which serves as a stop for the levers 20, which will be described more fully with reference to the operation of the machine. The diverging limbs of the bracket 38 are provided with prolongations 39. Each housing 24 of the valve is arranged between two plates 41, which are arranged on either side of the brackets 38 so as to be rotatable on the sleeves 37. To one of the plates 41 is secured a lever 42, which can be adjusted and fixed with respect to a bow 44, provided with recesses 43 (see FIGURES 1, 2 and 4). On the remote sides of the plates 41 an arm 45 is adapted to rotate about a sleeve 37, said arm being secured to a part 46, extending parallel to the shafts 18 and 19 and located below said shafts and terminating at one end in an upwardly extending lever 47, which can be fixed in two positions in recesses 48 provided on the side of the bow 44 opposite the side of the recesses 43.

For explaining the operation of the machine described above it will be sufficient to specify the operation of one feeler since the other feeler operates in exactly the same manner.

In operation of the combine the platform 1 with the crop dividers arranged on it is moved at a specified height above the ground, while the feelers arranged below the dividers 7 and in front of the cutting mechanism are dragged over the ground. When a feeler 8 strikes an unevenness, it will be turned upwards in the direction of the arrow A about the shaft 10 (see FIGURE 1). The rod 13, extending in the longitudinal direction of the crop divider 7, then moves in the direction of the arrow B, so that the arm 15, coupled with the rod, and the shaft 18, coupled herewith, are turned in the direction of the arrow C (see FIGURE 3). From FIGURE 3 it will be apparent that in a given position of the feeler 8 with respect to the platform 1 the sliding rod 23 is in the position shown in this figure relative to the housing 24. None of the bores 29 and 30 then communicates through the bore 27 in the sliding rod 23 with the bore 28. However, when the feeler 8 is turned as described above, the bracket 38 also turns in the direction of the arrow C. The helical spring 25, surrounding the sliding rod 23, is then capable of displacing the sliding rod so that the stop 27A engages the housing 24 and the stop 26A engages the stop 26. The bore 28 is thus brought to communicate through the bore 27 with the bore 30 and pressure-controlled liquid can flow from the duct 32A through said bores into the duct 31 and into the lifting cylinder 32, so that the platform is lifted on the side of the feeler and the cutting mechanism, in this case the cutter bar, is carried across the unevenness. After the obstacle has been passed by, the feeler returns to its initial position. The shaft 18 thus turns in a direction opposite the arrow C. The bracket 38 thus engages by its web the lever 20, which is thus also turned, the sliding rod 23 being moved back into its initial position with respect to the housing 24 of the valve. During the return movement the sliding rod moves so that the opening 29 communicates for a short instant with the opening 28, so that such a quantity of liquid can flow out of the lifting cylinder 32 that the initial height of the platform on the side of the feeler concerned is regained.

The platform can be brought to a given desired height or into a transport position by simultaneously energizing of the two lifting cylinders 32 by means of the lever 47. When this lever is displaced in the direction of the arrow D, the arms 45 turn in the direction of the arrow E until the part 46 engages the prolongation 39 of one of the limbs of the bracket 38. Consequently, together with the shafts 18 and 19 these prolongations are also turned in the direction of the arrow E and the spring 25 surrounding the sliding rod 23 can displace this rod so that the bore 30 communicates with the bore 28 and the lifting cylinders 32 are energized. After lifting has been performed, the lever 47 can be inserted into the other recess 48. When the lever is moved out of this recess in the opposite direction, the bore 29 will communicate with the bore 28 so that liquid can flow out of the lifting cylinder 32 and the platform is lowered.

The adjustment of the positions of the feelers 8 with respect to the cutting mechanism and the platform is carried out by means of the lever 42. By means of this lever the housing 24 can be displaced. In the position of the lever shown in the figures the feelers occupy their topmost positions with respect to the platform. When the lever 42 is displaced in the direction of the arrow F (see FIGURE 1), the housing 24 moves in the same direction until it engages the stop 27A on the sliding rod 23. The platform, as described above, is thus lifted. Upon a further turn of the lever, the lever 20 is also turned in the direction of the arrow F, so that it does no longer exert pressure on the bracket 38, which, together with the shaft 18 or 19, turns also under the action of the spring 17 and the weight of the feeler 8 in the direction of the arrow F. The feeler thus moves to a different position relative to the platform. When the lever 42 is inserted into one of the recesses 43 of the bow 44, the bracket 38 urges the lever 20 and the sliding rod 23 back into the position shown in FIGURE 3 under the action of the spring 17 and of the weight of the feeler.

Figure 5:
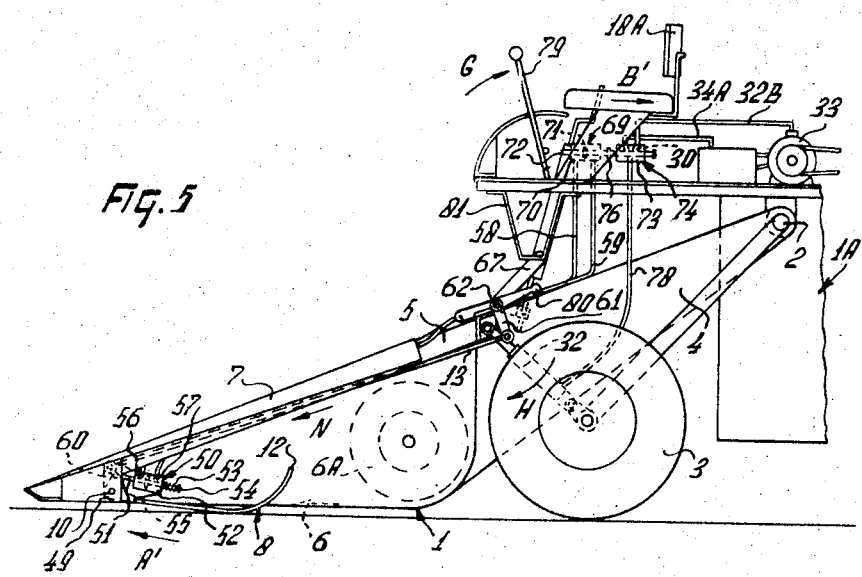
FIGURE 5 is a side elevation of the front portion of a second embodiment of the invention, also shown diagrammatically, the reel also being omitted.

The construction of the invention shown in FIGURE 5 corresponds chiefly with the construction shown in FIGURES 1 and 2. The parts shown in FIGURE 5, which correspond with those of FIGURES 1 and 2, are designated by the same reference numerals. In the embodiment shown in FIGURE 5 each feeler 8 is hinged through an angular lever 49, which is pivoted to the crop divider 7, the horizontal shaft 10, extending transversely of the direction of travel serving as a fulcrum, to a rod 51 associated with a control-valve 50 and adapted to be displaced in a housing 52. The rod 51, coupled at one end pivotally with the angular lever 49, is surrounded by a spring 53 at its other end, which projects beyond the housing, said spring being arranged on the housing 52 between a stop 54 on the rod.

The sliding rod 51 is provided inside the housing 52 with a piston 55 and the rectangular housing is provided near its ends with two ports 56 and 57, each port communciating with a duct 58 and 59 respectively. When the feeler is moved into a given position relative to the platform, the piston 55 occupies the position shown in FIGURE 5. The shaft 10 is provided with a supporting member 60, which holds the housing 52 of the control-valve 50. The supporting member 60 has a triangular shape and near the apex of the triangle it is hinged to the rod 13, extending in the longitudinal direction of the crop divider 7. The rod 13 is hinged to a lever 61, which is secured to a horizontal shaft 62, which extends transversely of the direction of travel and which is journalled in bearings provided on the part 4 of the platform. As shown in FIGURE 6, this shaft 62 is furthermore provided with an arm 63, which is provided at its end with a threaded stub 64, adapted to co-operate with a screw spindle 65, which extends to the proximity of the driver's seat 18A. The screw spindle 65 is pivotally coupled with a bellcrank 67, which is adapted to turn around the shaft 62, which extends transversely of the direction of travel. The end of the bellcrank 67 remote from the screw spindle is coupled with the part 5 of the platform 1 by means of a draw spring 68. The ducts 58 and 59 communicating with the housing 62 of the control-valve 50 located near the feeler 8 communicate with a control-valve 69 provided on the frame of the harvester and also provided with a housing 70 accommodating a sliding rod 72, provided with a piston 71. This sliding rod extends into the housing 73 of a control-valve 74, which is constructed in the same manner as the control-valve described with reference to FIGURE 3.

Between the control-valve 69 and the control-valve 74 and at the free end of the sliding rod projecting from the control-valve 74, the rod is provided with stops 76. From the control-valve 74 a duct 78 passes to the lifting cylinder 32 and the openings 29 and 30 communicate, through a duct 34A and 32B respectively like in the embodiment shown in FIGURES 1 and 2, with a reservoir 35 and a pump 33. Each feeler is associated with its own control-valve 69 and its own control-valve 74. The figures show only one combination. Near the driver's seat 18A there is provided a lever 79, by means of which the sliding rod 72 in the control-valve 69 and in the housing 74 of the control-valve can be displaced in the direction of the arrow G, so that the platform as a whole can be brought to the desired height or to the transport position. The lever controls the two control-valves 69 and the two control-valves 74.

In the construction shown in FIGURE 5 the piston 55 in the control-valve 50 is displaced in the direction of the arrow A' when the feeler 8 moves upwardly over an obstacle in the ground surface. As a result, the piston 71 in the housing 70 of the control-valve 69 moves in the direction of the arrow B', so that the lifting cylinder 32 is energized by means of the control-valve (see the operation of the control-valve shown in FIGURE 3) and the platform is lifted on the side of the feeler concerned. After the obstacle has been passed by, the feeler moves the pistons 55 and 71 in the respective control-valves back to their positions shown, while the initial movements of the pistons are such that liquid urged into the lifting cylinder can flow back through the control-valve 74 until the platform has regained its normal position relative to the ground surface. By means of the lever 79 the sliding rod 72 can also be displaced in the direction of the arrow B'. Thus, via the control-valve the platform is lifted by the two lifting cylinders 32 and through the control-valve 69 the feeler is lifted as far as possible.

By turning the arm 63 by means of the screw spindle 65 the position of the feeler 8 relative to the cutting mechanism and the platform can be adjusted. The supporting member 60 is turned through the rod 13, together with the control-valve 50 and the feeler 8 about the shaft 10. The shaft 62 is provided with an arm 80, which reaches, when the platform is lifted, a stop 81 on the frame of the combine and turns the shaft in the direction of the arrow H. Thus the rod 13 shifts in the direction of the arrow N and the feeler 8, together with the control-valve, is lifted further. From FIGURE 6 it will be seen that the screw spindle 65 arrives in the position shown in broken lines.

In the embodiment shown in FIGURES 7 and 8 the parts corresponding to those of the embodiment of FIGURES 1 and 2 are designated by the same reference numerals. In this embodiment the cutter bar 6, forming the cutting mechanism, is adapted to be turned relatively to the platform 1 about a substantially horizontal shaft 82, located directly behind said cutter bar and extending transversely of the direction of travel. The cutter bar thus arranged is provided on either side with parts, extending in the direction of travel and formed by crop dividers 83, which can be turned together with the cutter bar 6 about said shaft 82. Below the upper side of the crop divider 83 a feeler is provided also in this embodiment, which feeler is formed here by a wheel 84. The wheel 84 is pivoted to the crop divider 83 by means of two arms 85 and 86. The arm 85 is pivotal at a point which is located in front of the rotary axis 87 of the wheel 84, whereas the arm 86 is pivotal at a point which is located behind the rotary axis 87 of the wheel 84. Between the arm 85 and the crop divider there is provided a spring 85A.

The arm 86, which extends from the rotary axis 87 of the wheel 84 to the rear in upward direction, includes a lifting cylinder 88, which communicates through a duct 89 with a control-valve 90 near the driver's seat 18A on the combine. The construction and the operation of said valve correspond completely with those of the valve described with reference to FIGURE 3. The sliding rod 91 associated with the steering valve projects on either side from the housing of the valve and is surrounded at said ends by a spring 92, which is arranged at one end between the housing and a stop 93 and at the other end between the housing and a lever 94, hinged to the sliding rod. The lever 94 is furthermore hinged to the housing of the valve through an arm 95, located below the sliding rod. The duct 89 is connected with the bore 28 and the bores 29 and 30 communicate through a duct 96 and 97 respectively with a reservoir 35 and a pump 33.

The end of the crop divider 83 located near the platform is provided near its upper end in a bearing 98 with a slidable rod 99, which is furthermore displaceable in the housing of a control-valve 100, which is constructed in the same way as the valve described with reference to FIGURE 3. On either side of the bearing 98 the rod 99 is surrounded by a spring 101. One spring is enclosed between the bearing 98 and a stop 102 on the rod and the other spring between the bearing 98 and the housing of the control-valve. The control-valve is pivotal about a shaft 100A which is arranged between a tag 100B and a side wall of the part 5 of the platform.

Near the driver's seat 18A there is provided a second valve 103, which also corresponds with the valve of FIGURE 3 with respect to construction and operation. The bore 28 in the housing of the valve 100 communicates through a duct 104 with the bore 29 in the housing of the valve 103. The bore 30 in the housing of the valve 100 communicates through a duct 105 with the pump 33. A duct 106 communicates with the bore 30 in the housing of the valve 103 and with the pump 33. The bore 29 in the housing of the valve 100 communicates through a duct 107 with the reservoir 35 and the bore 28 in the housing of the valve 103 communicates through a duct 108 with the lifting cylinder 32. Also in the construction of this embodiment a separate valve and a separate lifting cylinder 32 is provided for each feeler.

The device shown in FIGURES 7 and 8 operates as follows.

When the feeler 84 strikes an obstacle, the rod 99 shifts to an extent such that the bore 28 in the housing of the control-valve 100 communicates with the bore 30. Thus compressed liquid from the pump 33 can flow towards the lifting cylinder 32, since in operation the bore 28 in the housing of the control-valve 103 communicates with the bore 29 of said housing. After the platform has been slightly lifted on the side concerned and after the obstacle has been passed over, the assembly re-occupies its initial position by the displacement of the rod 99 in the opposite direction. The rod thus moves so that during this movement the bore 28 communicates with the bore 29 so that the liquid pressed into the lifting cylinder can flow out of the latter, the platform thus regaining its intial position. When the feeler wheel 84 gets into a depression, the bore 29 communicates with the bore 28 through the rod 99, so that liquid can flow out of the lifting cylinder and the platform is locally lowered. After the depression has been passed by, the platform is moved back into its initial position.

In order to lift the platform a lever 109, which is hinged to a sliding rod 110 of the control-valve 103 and through an arm 111 to the housing of the control-valve, can displace the sliding rod in the direction of the arrow M, so that the bore 28 communicates with the bore 30 and liquid is urged out of the pump 33 into the lifting cylinder 32. For each feeler there is provided a first control-valve 100 and a second control-valve 103. The control-valves 103 are simultaneously actuated when the lever 109 is turned. The position of the feeler wheel 84 can be adjusted by means of the control-valve 90 in the same manner by turning the lever 94.

In the embodiment shown in FIGURE 9 the components corresponding with those of FIGURES 7 and 8 are denoted by the same reference numerals. In this embodiment the crop dividers 112 are rigidly connected with the platform 1 and only the cutting mechanism formed by the cutter bar 6 is pivotal about a substantially horizontal shaft 113, which extends transversely of the direction of travel. A lever 114 is provided on the shaft 113 one on each side of the platform 1 below the upper side of a crop divider 112, said lever extending in a vertical direction. At the other end said lever is hinged through a shaft 115 between the limbs of a bracket 116, which is secured to the end of a substantially horizontal rod 117, which is displaceably arranged in the housing of a control-valve 118. Inside the housing the rod 117 is provided with a piston 119 and the housing of the control-valve is provided with two ports 120, which communicate through ducts 121 with two ports 122 of a control-valve 123 on the frame 1A of the combine. Between the two ends the vertical lever 114 is hinged by means of a pin 124 between the limbs of a bracket 125, which is secured to one end of a substantially horizontal rod 126, which is displaceably arranged in a bearing 127, provided on the side wall of the platform. The rod 126 is surrounded on either side of the bearing 127 by a spring 128, one spring being located between the bracket 125 and the bearing 127, the other spring being located between the bearing 127 and a stop 129, provided near the end of the rod. The stress of the springs 128 on the rod 126 may be varied by means of a set bolt, so that the resilient pivotal motion of the cutter bar about the shaft 113 is affected.

The control-valve 123 provided on the frame 1A of the combine is provided with a sliding rod 130 with a piston 131, located inside the housing, said rod being linked through a spring 130A to a sliding rod 132 of a control-valve 133, which has the same construction as the control-valve 90 of the preceding embodiment. Also with this control-valve the bore 30 communicates with the pump 33 and the bore 29 with the reservoir 35 through ducts 97 and 106 respectively. The bore 28 communicates through a duct 134 with the lifting cylinder 32. A lever 136 is pivotally arranged on the frame by means of a shaft 135, which lever can be displaced along a circular arc 137, during which displacement it can co-operate with the sliding rod 132 of the control-valve 133. On either side of the cutting mechanism there is provided a control-valve co-operating with the cutter bar, which serves as a feeler. In connection with the feeling function of the cutter bar, it is provided near each of its ends with a forwardly projecting resilient strip 138. For each of the control-valves 118 there is provided a control-valve 123 and a valve 133 on the frame of the combine.

The construction shown in FIGURE 9 operates as follows.

In operation the cutter bar 6, supported from the platform 1, is moved just above or over the ground surface. When the cutter bar, which serves in this embodiment as stated above as a feeler encounters an unevenness in the ground surface, the vertical lever 114, coupled with the shaft 113, will turn in the directione of the arrow A, when the cutter bar pivots around the shaft 113. The sliding rod 117 of the control-valve 118, coupled with the lever 114, is also turned in the direction of the arrow A, so that through the control-valve 123 a force iis exerted on the sliding rod 132 of the valve 133 in the direction of the arrow B. As a result the bore 30 of the valve communicates with the bore 28 and liquid can flow under pressure towards the lifting cylinder 32, so that the platform 1 is lifted on the side where the control-valve 118 coupled with the cutter bar has become operative. After the unevenness has been passed over, the sliding rod 132 of the valve 133 is moved back into its initial position through the control-valves, while the movements of the pistons in the valves is such that the bore 29 communicates for a short instant with the bore 28 and the liquid pressed into the cylinder 32 can flow away out of the cylinder, so that the platform is moved back to the initial height.

The platform can be lifted into the transport position by means of the lever 136, which is arranged near the driver's seat 18A and which can be moved to this end in the direction of the arrow C. Said lever thus displaces the sliding rod 132 provided in the valve 133 and through the bore in the sliding rod the compressed liquid can flow through the bores 28 and 30 into the lifting cylinder 32, so that the platform is lifted. Also in this construction separate control-valves and separate valves are provided for each end of the cutter bar. When the platform is lifted with the aid of the lever 136, the latter actuates the two valves 133, only one of which is shown in the figure.

In the construction according to the invention the mowing device comprises a cutter bar which is pivotal about a substantially horizontal shaft, extending in the close proximity of the cutter bar transversely of the direction of travel, while the cutter bar is provided with means which which are adapted, upon a swing of the cutter bar, to co-operate with an adjusting mechanism for adapting the height of the cutter bar above the ground surface. This adjusting mechanism is formed by a hydraulic circuit including control-valves and valves. It will be apparent, however, that the various parts of the circuit may, as an alternative, be actuated pneumatically.

The mowing device may be provided with at least one feeler which is adapted to co-operate with said adjusting mechanism for adapting the position of the cutting mechanism to the ground surface, said feeler being arranged on an element which extends from the cutting mechanism in forward direction with respect to the travelling direction. This provides a more effective operation of the feeler. The feeler is preferably located at least at a distance of 25 cms. in front of the cutting mecahnism.

The construction according to the invention provides a possibility of a very satisfactorily adaptation of the cutting mechanism of a mowing device to the unevennesses of the ground, while earth is prevented from being carried along with the crop and the cutting mechanism is protected from obstacles in the ground. The control-valves of the adjusting mechanism provided on either side of the cutting mechanism provide the possibility for the cutting mechanism of deflecting on either side independently, so that a smooth adaptation can be obtained.

FIGURE 10 shows a construction in which a combine comprising an adjusting mechanism and feeler wheels 84 co-operating with the former, as is shown in FIGURE 7, is mounted on a tractor. From this figure it will be seen that the tractor is coupled with a supporting structure 137A comprising two beams 138A, extending at a given distance from each other in the direction of travel and interconnected near their ends remote from the tractor by a beam 139. The ends of the beams 138A are furthermore coupled with a beam 140, extending parallel to the beam 139 throughout the width of the tractor. The supporting structure 137A is coupled with the front side of the tractor by the free ends of the beams 138A by means of pins 141. With the combine shown in the figure the platform 142 and the part 143 located at the side of the tractor are integral with each other, this unit being adapted to hinge about the rotary axes of two ground wheels 144, supporting the part 143 and located just in front of the axles of the hindwheels of the tractor. On the rear side the part 143 is coupled with a grain tank 145, which is secured to the lifting device 146 of the tractor. The lifting cylinder 32 for each of the feeler wheels 84, as is shown in the figure, is arranged between the platform 142 and the beam 140 of the supporting structure 137A. The members to be actuated by the driver, which are constructed in the same form as those of FIGURE 7, are arranged in this construction in the vicinity of the driver's seat on the tractor. The operation of the feelers and of the adjusting mechanism actuated thereby corresponds completely with the operation of the construction of FIGURE 7.

FIGURE 11 shows the combine mounted on the tractor as shown in FIGURE 10, which comprises here a different embodiment of the adjusting mechanism and of a feeler. In the embodiment the feeler 147 is pivotally linked to a rod 151 associated with a control-valve 150, and adapted to slide in a housing 152 secured to a crop divider, by means of a bellcrank 148, which is pivotally coupled with the crop divider 83 so as to be turnable about a horizontal shaft 149, extending transversely of the travelling direction. The feeler 147 is formed by two bars extending to the rear from their fastening points and lying side by side on plan and formed by hairpin steel spring wire, the curved part being secured to the bellcrank 148. Near the free end of the feeler the bars are bent over upwardly over a portion 147A. In operation the feeler extends substantially in a horizontal direction. The bar 151, coupled at one end with the bellcrank 148, is surrounded at its other end, protruding from the housing, by a spring 153, which is held between a stop 154 on the bar and the housing 152.

The sliding rod 151 is provided inside the housing 152 with a piston 155 and the rectangular housing is provided near its ends with two ports 156 and 157, each port communicating with a duct 158 and 159 respectively. When the feeler 147 is arranged in a given position relative to the platform, the piston 155 is in the position shown in FIGURE 11. The ducts 158 and 159 communicating with the housing 152 of the valve 150 provided near the feeler 147 communicate with a second valve 160 arranged on the frame of the tractor and also provided with a housing accommodating a sliding rod 162 with a piston 161. This sliding rod extends into the housing of a valve 163, which is constructed in the same manner as the valve 90 described with reference to FIGURE 7. Between the valve 160 and the valve 163 the free end of the sliding rod projecting from the valve 163 is provided with stops 164. From the valve 163 a duct 165 conducts to the lifting cylinder 32, and the openings 28 and 29 communicate through a duct 166 and 167 respectively, as in the embodiment shown in FIGURE 7, with a reservoir 35 and a pump 33. For each feeler there is provided a separate first valve 160 and a second valve 163. The figure shows only one combination. Near the driver's seat the frame of the tractor is provided with a lever 168, by means of which the sliding rod 162 of the valve 160 and the housing of the valve can be displaced in the direction of the arrow G, so that the platform can then be moved as a whole to a desired height or into the transport position. The lever thus actuates the two first valves 160 and the two second valves 163.

In the construction shown in FIGURE 11 the piston 155 in the valve 150 is displaced in the direction of the arrow A, when the feeler 147 moves upwardly over an unevenness of the ground surface. As a result the piston 161 in the housing of the valve 160 moves in the direction of the arrow G, so that the lifting cylinder 32 is actuated by means of the valve 163 (see the operation of the valve 90 of FIGURE 7). On the side of the feeler concerned the platform is thus lifted. After the obstacle has been passed over, the feeler moves the pistons 155 and 161 in their respective valves back into their positions shown and initially the movements of the pistons are then such that liquid pressed into the lifting cylinder 32 can flow through the valve 163 until the platform re-occupies its normal position relative to the ground surface. By moving the lever 168 in the direction of arrow B, the sliding rod 162 can also be displaced in the direction of the arrow G. By means of the valve 163 the platform is lifted by means of the two lifting cylinders 32 and through the valve 160 also the feeler is lifted as far as possible.

FIGURE 12 shows diagrammatically a tractor-drawn combine, which may be hitched to the rear of the tractor by means of a draw bar. The drawn combine shown comprises a construction for adapting the position of the cutting mechanism to the ground surface, said construction being similar to that shown in FIGURE 11 and shown in FIGURE 12 only diagrammatically. The levers provided for actuating the valves associated with the hydraulic circuit are arranged near the tractor on the draw bar and the pump can be driven by the power take-off shaft.

The construction according to the invention described above in which the cutting mechanism is provided with feeler members for regulating the position of the cutting mechanism relative to the ground surface ensures that, in operation, the cutting mechanism and the platform are held at the adjusted height and that contact with unevennesses of the ground are avoided. This is very important, since the driver is at a comparatively great distance from the cutting mechanism and the platform, so that it is difficult for him to check the position of the cutting mechanism and of the platform and the correct height thereof. With the drawn combine the situation is moreover such that the driver turns his back to the cutting mechanism and the platform.

In the constructions according to the invention a feeler adapted to co-operate with an adjusting mechanism for adapting the position of the cutting mechanism to the ground surface is located, viewed in the travelling direction, at a distance of at least 25 cms in front of the cutting mechanism. This ensures an effective operation of the feeler. On either side of the cutting mechanism there is arranged a feeler, each of which is adapted to co-operate with its own lifting cylinder associated with the adjusting mechanism for displacing the cutting mechanism. In this way an independent matching of the ground is obtained on either side of the cutting mechanism. The adjusting mechanism of the constructions described above is formed by a hydraulic circuit comprising first valves, second valves and lifting cylinders and fed from a reservoir by a pump. However, pneumatic energizing of the adjusting mechanism is also possible.

Owing to the constructions described above the combine can operate highly effectively, particularly in the case of low-lying crop without the risk of great soiling of the crop fed into the machine.

It will be apparent that the construction described above may also be employed on other harvesting machines comprising a cutting or pick-up mechanism.

The machine shown in FIGURES 13 and 14 is a combine, the foremost portion of which is shown diagrammatically. The parts corresponding with those of the first embodiment are denoted by the same reference numerals. The foremost portion comprises a mowing table or platform 1, which is adapted to pivot in a direction of height about a horizontal shaft 2, extending transversely of the travelling direction, with respect to the well-supported frame 1A of the combine. Of the ground wheels supporting the frame of the combine the figures show only the ground wheels 3 located on the front side. The platform 1 comprises an elevator part 4 and a part 5, in which the cutting mechanism formed by a cutter bar 6 and an auger 6A, located behind the cutter bar, for the lateral delivery of the mown crop, are supported.

From FIGURE 13 it will be seen that on either side of the cutter bar 6 the part 5 of the platform 1 is provided with a forwardly projecting crop divider 7. Near its front side, below the bent-over rim, each crop divider 7 is provided with a vertical guide 169. In said guide an arm 170 is arranged so as to be slidable. The arm is coupled with a support 171, extending in the travelling direction, and provided near each end with a rotary shaft 172 for a wheel 173. The arm 170 is provided with holes which are adapted to co-operate with holes 174 provided in the guide. A pin 175 can be inserted through said holes for fixing the support 171 of the wheels 173 in given positions relative to the cutting mechanism and to the platform supporting said cutting mechanism.

From FIGURE 14 it will furthermore be seen that, between the platform 1 and the frame 1A of the combine, on either side of the longitudinal line of the harvester, a pressure spring 177 is arranged to surround a rod 176, coupled pivotally to the platform and the frame by means of shafts 175A, so that the platform can resiliently swing upwardly about said shaft 2.

In order to move the platform into the transport position, a lifting cylinder 32 is provided each on one side of the longitudinal center line. Said cylinder can be actuated by means of a valve 179 provided near the driver's seat 18A and communicating through a duct 180 with the lifting cylinder 32. The valve 179 itself communicates through a duct 181 and 182 respectively with a reservoir 35 and a pump 33 respectively on the frame of the combine. The valve 179 is furthermore provided with a lever 18B, by means of which the valve can be actuated for lifting the platform.

In the embodiment shown in FIGURES 15 and 16 the parts corresponding with those of the preceding embodiments are denoted by the same reference numerals. From the figures it will be seen that on either side of the platform 1 a wheel 184 is provided in a position substantially straight behind the crop divider 7, viewed in the direction of travel on the rear side of the part 5. The axis 185 of rotation of said wheel is coupled with the platform by means of two arms 186 and a bracket 187. The arms 186 are pivoted to the lower side of the platform and the bracket 187 is pivoted through a lifting cylinder 188 to the upper side of the platform. The lifting cylinder 188 communicates through a duct 189 with a valve 190, provided near the driver's seat 18A. The valve 190 can be actuated by means of a lever 191 and communicates through a duct 192 and 193 with the reservoir 35 and the pump 33 respectively.

From FIGURE 16 it will be apparent that the wheels 184 are barrel-shaped and their center is provided with a ridge 186A. Above the wheels there is arranged a scraper 186B. Like in the preceding embodiment a lifting cylinder 32 is provided on each side of the longitudinal center line of the combine for lifting the platform and to move it into the transport position. The arm 194 of the lifting cylinder adapted to slide in the cylinder is surrounded by a spring 195, so that the platform is also in this case capable of swinging resiliently around the shaft 2. As in the preceding embodiment these lifting cylinders are energized by means of a valve 179, which can be actuated by a lever 183 and which communicates through a duct 180 with the cylinders.

The machine shown in the figures operates as follows.

In the device shown in FIGURES 13 and 14 the mowing table or platform bears during the travel of the combine on the wheels 173, which scan the ground surface during the travel and thus adapt the position of the cutting mechanism together with the platform to the unevennesses of the ground. The wheels 173 are arranged so that the rotary axis of the hindmost wheel is located at least ten centimeters in front of the cutting mechanism. The position of the wheels 173 relative to the cutting mechanism may be adjusted by means of the arm provided in the guide. The support from two wheels lying one behind the other viewed in the direction of travel has the advantage that the pressure on the ground for each wheel is reduced, so that the feeler function of the wheels is more effective.

In the embodiment shown in FIGURES 15 and 16 the wheels 184 are located behind the mowing table or the platform. The barrel shape of the wheels 184 provides a satisfactory distribution of the pressure, so that their guiding function for the platform is improved. The scraper 186B arranged above the wheels 184 prevents soil and other dirt from adhering to the wheels, which might involve a variation in the position of the platform. The resilient support of the platform in the two embodiments provides such a relief for the wheels, that they can perform their feeling function under most ideal conditions.

The construction according to the invention, in which a mowing table adapted to pivot about a substantially horizontal shaft relative to the frame of a combine is supported from at least one wheel for matching the ground surface prevents in a simple manner damage of the cutting mechanism and soiling of the crop fed into the machine. With known combines an adaptation as provided by the construction according to the invention is not possible, since in operation it is practically not possible for the driver to adjust the platform always so that the cutting mechanism follows satisfactorily all unevennesses of the ground surface.

Having thus described my invention, what I claim as new and desire to secure by Letters Patent of the United States is:

1. A harvester thresher comprising a mowing table with a cutting mechanism, the said mowing table having crop dividers, at least one ground contacting feeler member being located under the lower side of at least one of said crop dividers and forwardly of the said cutting mechanism, a hydraulically actuated adjusting device connected to the said cutting mechanism for regulating the height of the mowing table with respect to the ground, said feeler member being pivotally mounted with respect to the corresponding crop divider and being in communication with said adjusting device, whereby the height of the mowing table is adjusted with respect to the ground during travel of said cutting mechanism.

2. The invention of claim 1, wherein the said adjusting device includes a separate lifting cylinder for each feeler member, each said cylinder being responsive to the movements of its corresponding feeler member.

3. The invention of claim 1, wherein valve means is included in the device for hydraulically adjusting the position of said feeler member relative to the crop-working mechanism.

4. The invention of claim 3, wherein said feeler member is pivotable relative to said valve means and is coupled to a bell-crank with a sliding rod, a control valve in said feeler being arranged on a support, said support being connected to a shaft about which said feeler member is adapted to pivot, said support being coupled to an adjusting element for adjusting the position of said feeler member relative to the corresponding said crop divider and said mowing table.

5. The invention of claim 4, wherein a bar is coupled with a shaft and a screw spindle is connected to said shaft, said shaft being provided with a lever which, when the mowing table is lifted in a transport position, strikes a stop provided on the frame of a machine, wherein the supporting member and the control valve are turned and the feeler member is tilted upwards.

6. The invention of claim 1, wherein said feeler is a wheel.

7. The invention of claim 6, wherein two bars couple said wheel to the lower side of a divider, whereby said wheel is pivotably connected to said divider at a first point forward of the axis of said wheel and at a second point to the rear of the axis of the wheel.

8. The invention of claim 7, wherein one of the bars includes a hydraulic adjusting cylinder, whereby the position of said wheel can be adjusted.

References Cited

UNITED STATES PATENTS

| | | | |
|---|---|---|---|
| 607,704 | 7/1898 | Pitcher | 56—318 |
| 3,137,984 | 6/1964 | Shonkwiler | 56—214 |
| 3,196,599 | 7/1965 | Meiners et al. | 56—11 |
| 3,222,851 | 12/1965 | Schnaidt et al. | 56—11 |

ABRAHAM G. STONE, *Primary Examiner.*

ANTONIO F. GUIDA, *Examiner.*